United States Patent [19]

Lubowitz et al.

[11] Patent Number: 5,446,120

[45] Date of Patent: Aug. 29, 1995

[54] POLYETHERSULFONE OLIGOMERS AND BLENDS

[75] Inventors: Hyman R. Lubowitz, Rolling Hills Estates, Calif.; Clyde H. Sheppard, Bellevue, Wash.

[73] Assignee: The Boeing Company, Seattle, Wash.

[21] Appl. No.: 460,396

[22] Filed: Jan. 3, 1990

Related U.S. Application Data

[63] Continuation of Ser. No. 223,308, Jul. 25, 1988, abandoned, which is a continuation-in-part of Ser. No. 785,364, Oct. 7, 1985, Pat. No. 4,871,475.

[51] Int. Cl.⁶ .............................................. C08G 75/23
[52] U.S. Cl. .................................. 528/171; 528/170; 528/172; 528/173; 428/260; 428/287; 428/288; 428/290; 428/408; 428/410; 428/411.1; 428/902; 427/350; 427/385.5
[58] Field of Search ............... 528/17 O, 171, 172, 528/173; 428/288, 290, 408, 419, 260, 902, 287, 411.1; 427/385.5, 350

[56] References Cited

U.S. PATENT DOCUMENTS 4,446,191  5/1984  Miyadera et al. ............... 428/245

*Primary Examiner*—Paul R. Michl
*Assistant Examiner*—P. Hampton-Hightower
*Attorney, Agent, or Firm*—Senniger, Powers, Leavitt & Roedel

[57] ABSTRACT

Polysulfone and polyethersulfone oligomers made by the condensation of crosslinking end caps, monomers, diols, and dihalogen moieties exhibit improved solvent resistance which is necessary for their use in aerospace applications. Blends of the oligomers and corresponding polymers formed from the diols and dihalogen moieties, but without end caps, exhibit superior impact resistance when cured. The present invention describes improved prepregs and composites made from these oligomers.

19 Claims, No Drawings

POLYETHERSULFONE OLIGOMERS AND BLENDS

REFERENCE TO RELATED INVENTION

This is a continuation of application Ser. No. 223,308, filed Jul. 25, 1988 now abandoned, which is a continuation-in-part of Ser. No. 785,364 filed Oct. 7, 1985 now U.S. Pat. No. 4,871,475.

This application also relates to U.S. Pat. No. 4,476,184, issued Oct. 9, 1984, and to U.S. Pat. No. 4,536,559, issued Aug. 20, 1985.

TECHNICAL FIELD

The present invention relates to prepregs and composites made from corsslinkable polysulfone and polyethersulfone oligomers formed by the condensation of dihydric phenols and halogenated aromatic compounds.

BACKGROUND ART

U.S. Pat. No. 4,476,184, disclosed thermoplastic polysulfone oligomers having dimethyloxynadic (DONA) crosslinkable end caps to impart solvent-resistance to the cured resins. Similar oligomers having difunctional nadic, maleic, and phenylacetyleneic end caps are disclosed in U.S. Pat. No. 4,536,559.

Recently, chemists have sought to synthesize oligomers for high performance advanced composites suitable for aerospace applications. These composites should exhibit solvent resistance (particularly to MEK and methylene chloride); be tough, impact resistance, and strong; be easy to process; and be thermoplastic. Oligomers and composites that have thermo-oxidative stability and, accordingly, can be used at elevated temperatures are particularly desirable.

While epoxy-based composites are suitable for many applications, their brittle nature and susceptibility to thermal and hydrolytic degradation make then inadequate for many aerospace applications, especially those applications which require thermally stable, tough composites or service in harsh conditions. Accordingly, research has recently focused on polyimide composites to achieve an acceptable balance between thermal or hydrolytic stability, solvent resistance, and toughness, Still the maximum temperatures for use of the polyimide composites, such as PMR-15, are about 600°–625° F., since they have glass transition temperature of about 690° F. PMR-15 also suffers from brittleness.

There has been a progression of polyimide sulfone compounds synthesized to provide unique properties or combinations of properties. For example, Kwiatkowski and Brode synthesized maleic-capped linear polyacrylimides as disclosed in U.S. Pat. No. 3,839,287. Holub and Evan synthesized maleic- or nadic-capped, imido-substituted polyester compositions as disclosed in U.S. Pat. No. 3,729,446. We synthesized thermally stable polysulfone oligomers as disclosed in U.S. Pat. No. 4,476,184 or U.S. Pat. No. 4,536,559, and have continued to make advances with polyetherimidesulfones, polybenzoxazolesulfoens, plybutadienesulfones, and "star" or "starburst" multidimensional oligomers. We have shown surprisingly high glass transition temperatures yet reasonable processing and desirable physical properties in many of these oligomers and their composites.

Polybenzoxazoles, such as those disclosed in our U.S. Pat. Nos. 4,965,336 and 4,868,270 may be used at temperatures up to about 750°–775° F., since these composites have glass transition temperatures of about 840° F. Some aerospace applications need composites which have even higher use temperatures while maintaining toughness, solvent resistance, ease of processing, formability, strength, and impact resistance.

Multidimensional oligomers, such as disclosed in our U.S. Pat. No. 5,210,213 are easier to process than some advanced composite oligomers since they can be handled at lower temperatures. Upon curing, however, the oligomers chemically crosslink through their end caps in addition polymerization so that the thermal resistance of the resulting composite is markedly increased with only a minor loss of stiffness, matrix stress transfer (impact resistance), toughness, elasticity, and other mechanical properties. Glass transition temperatures above 950° F. are achievable.

Commercial polyesters, when combined with well-known diluents, such as styrene, do not exhibit satisfactory thermal and oxidative resistance to be useful for aircraft or aerospace applications. Polyarylesters (i.e., arylates) are often unsatisfactory, also, since the resins often are semi-crystalline which may makes them insoluble in laminating solvents, intractable in fusion, and subject to shrinking or warping during composite fabrication. Those polyarylesters that are soluble in conventional laminating solvents remain so in composite form, thereby limiting their usefulness in structural composites. The high concentration of ester groups contributes to resin strength and tenacity, but also makes the resin susceptible to the damaging effects of water absorption. High moisture absorption by commercial polyesters can lead to distortion of the composite when it is loaded at elevated temperature.

High performance, aerospace, polyester advanced composites, however, can be prepared using crosslinkable, and capped polyester imide ether sulfone oligomers that have an acceptable combination of solvent resistance, toughness, impact resistance, strength, ease of processing, formability, and thermal resistance. By including Schiff base (—CH=N—), imidazole, thiazole, or oxazole linkages in the oligomer chain, the linear, advanced composites formed with polyester oligomers of our copending application U.S. Ser. No. 726,259 can have semiconductive or conductive properties when appropriately doped.

Conductive and semiconductive plastics have been extensively studies (see, e.g., U.S. Pat. Nos. 4,375,427; 4,338,222; 3,966,987; 4,344,869; and 4,344,870), but these polymers do not possess the blend of properties which are essential for aerospace applications. That is, the conductive polymers do not possess the blend of (1) toughness, (2) stiffness, (3) elasticity, (4) case of processing, (5) impact resistance (and other matrix stress transfer capabilities), (6) retention of properties over a broad range of temperatures, and (7) high temperature resistance that is desirable on aerospace advanced composites. The prior art composites are often too brittle.

Thermally stable multidimensional oligomers having semiconductive or conductive properties when doped with suitable dopants are also known and are described in our copending applications (including U.S. Ser. No. 773,381 to Lubowitz, Sheppard, and Torre), The linear arms of the oligomers contain conductive linkages, such as Schiff base (—N=CH—) linkages, between aromatic groups. Sulfone and either linkages are interspersed in the arms. Each arm is terminated with a mono- or difunctional end cap (i.e. an end cap having one or two crosslinking functionalities) to allow controlled crosslinking upon heat-induced or chemically-induced curing. Other "semiconductive" oligomers are described in our other copending applications.

Polyamide oligomers and blends are described in our U.S. Pat. Nos. 4,936,523, 4,847,333, and 4,876,328 and polyetherimide oligomers and blends are described in our U.S. Pat. No. 4,851,495.

Polyamideimides are generally injection-moldable, amorphous, engineering thermoplastics which absorb water (swell) when subjected to humid environments of immersed in water. Polyamideimides are generally described in the following patents: U.S. Pat. Nos. 3,658,938; U.S. Pat. Nos. 4,628,079; 4,599,383; 4,374,144; or 3,988,344. The thermal integrity and solvent-resistance can be greatly enhanced by capping amideimide backbones with monomers that present one or two crosslinking functionalities at each end of the oligomer, as described in our copending applications U.S. Ser. No. 092,740 and 181,013.

Blends of these oligomers comprise a mixture of an oligomer and a compatible polymer, generally of the same chemical family and of substantially the same backbone. The polymer is formed by an analogous condensation generally substituting a noncrosslinking endcap monomer (such as phenol, benzoic acid chloride, or aniline) for the crosslinking end cap used in the oligomers. Advanced composite (mixed chemical) blends and coreactive blends have also been described in our copending applications Ser. No. 167,604 and 174,747, respectively.

Interpenetrating or semi-interpenetrating networks are also known, such as those described by Egli Et al. in "Semi-Interpenetrating Networks of LARC-TPI" available from NASA-Langley Research Center.

The ethersulfone oligomers, blends, prepregs, and composites of the present invention provide aromatic ethersulfone materials which an improved mixture of properties over their prior art competitors, including solvent resistance and thermal stability. They are useful in many aerospace applications unsuited for their prior art materials.

SUMMARY OF THE INVENTION

Polysulfone and polyethersulfone oligomers, similar to those of U.S. Pat. No 4,476,184 and suitable for forming prepregs with suitable reinforcing additives, are prepared by the condensation of dihydric phenols (diols) and halogenated aromatic compounds (dihalogens). Solvent resistance is obtained in the cured resins by terminating the polymer chains with crosslinkable imidophenol end cap monomers ($E_i$—$\phi$—OH), wherein E is an unsaturated hydrocarbon selected from the group consisting of:

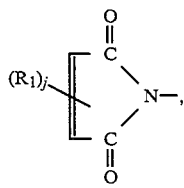

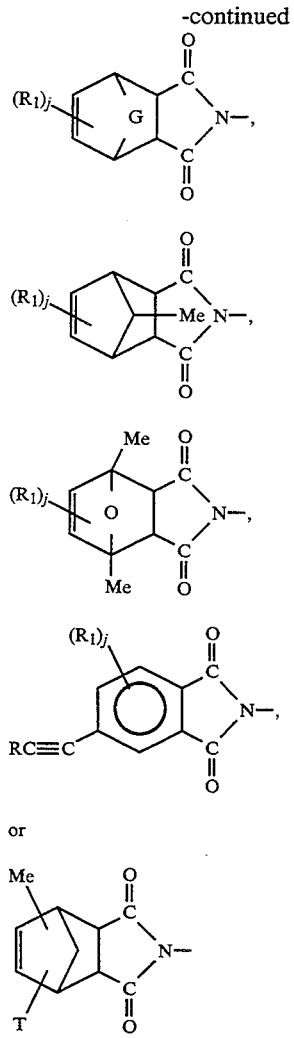

wherein
$R_1$ = lower alkyl, lower alkoxy, aryl, aryloxy, substituted aryl, substituted alkyl (including halogen or hydroxyl substituents), halogen or mixtures thereof;
$\phi$ = phenyl;
$j$ = 0, 1, or 2;
$i$ = 1 or 2;
T = allyl or methallyl;
Me = methyl;
G = —$CH_2$—, —O—, —S—, —$SO_2$—, —CO—, —CHR—, —$CR_2$—, or —SO—, and
R = hydrogen, methyl, or phenyl.

Monomers of this type are described in U.S. Pat. Nos. 4,661,604 and 4,739,030.

The preferred solvent-resistant polysulfone and polyethersulfone oligomers are prepared by condensing the end cap monomers with a mixture of aromatic dihydric phenols (diols or bisphenols) and difunctional halogenated aromatic moieties (dihalogens), according to the reaction scheme:
  2 moles of the end cap monomer;
  n = 1 moles of the dihalogen; and
  n moles of the diol,
wherein $n \geq 1$.

Conductive or semiconductive resins and composites are prepared from suitable oligomers by including a suitable dopant within the cured composite. The dopant is added to the oligomer prior to curing.

Preferred capped oligomers have formula weights between about 1,000 and 40,000; preferably between about 5,000 and 30,000; and, more preferably, between about 10,000 and 20,000. An oligomer with a molecular weight lower than about 1,000 will probably have excessive crosslinking, will lose its thermoplastic properties and, will consequently, have the disadvantages associated with thermosetting resins. If the oligomer has a molecular weight of more than about 40,000, insufficient crosslinking probably will occur and the resulting resin will have inadequate solvent resistance, as with prior thermoplastic resins. Without about 1,000 to 40,000, the crosslinked compounds have beneficial properties of both thermoplastic and thermosetting resins without the disadvantages of either.

Impact resistance of the cured composites formed from prepregs of the oligomers can be increased without deleterious loss of solvent resistance by forming the prepregs with a blend of capped oligomers (to provide crosslinking upon curing) and uncapped polymers, generally of the corresponding backbone to provide compatibility of the oligomer and polymer. A blend of the oligomer and polymer can be formed by dissolving the capped oligomer in a suitable first solvent dissoling the uncapped polymer in a portion of the first solvent or in a solvent miscible with the first solvent, mixing the two solvent solutions to form a lacquer, and applying the lacquer to fabric in a conventional prepregging process. The polymer may be from the same or a different chemical family, and the ratio of oligomer to polymer can be adjusted to tailor the properties of the resulting composites. Coreactive oligomers can be used. The blends can include more than two components, although only one oligomeric component is generally preferred.

Composites of the oligomers and of the blends are prepared by curing the prepregs or resins (i.e., oligomers or blends) in conventional vacuum bagging techniques.

BEST MODE CONTEMPLATED FOR THE INVENTION

Polysulfone and polyethersulfone oligomers are prepared by the simultaneous condensation reaction of:
2 moles of a crosslinkable end cap imidophenol;
n+1 moles of a difunctional halogenated aromatic moiety (dihalogen); and
n moles of a difunctional phenol (diol), wherein $n \geq 1$, by mixing the reactants under an inert atmosphere, and heating the mixture, if necessary, to induce the reaction. Best results are achieved by premixing the phenol and diol (with or without a suitable solvent) to form a premix, and adding the premix to the dihalogen (dissolved in a compatible solvent, if necessary or desirable). The oligomeric produce has the general formula:

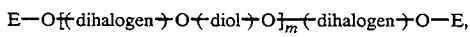

wherein E is defined below. Undesirable side reactions can be inhibited by including a base in the reaction mixture, generally selected from the group consisting of sodium or potassium carbonate or bicarbonate, sodium or potassium hydroxide, or mixtures thereof. The base buffers the reaction mixture by reacting with hydrogen ions evolved during the condensation,. An excess of base (at least about 10% more than the theoretical molar quantity) should generally be used.

The end cap phenol (E—OH) preferably is selected from the group consisting of:

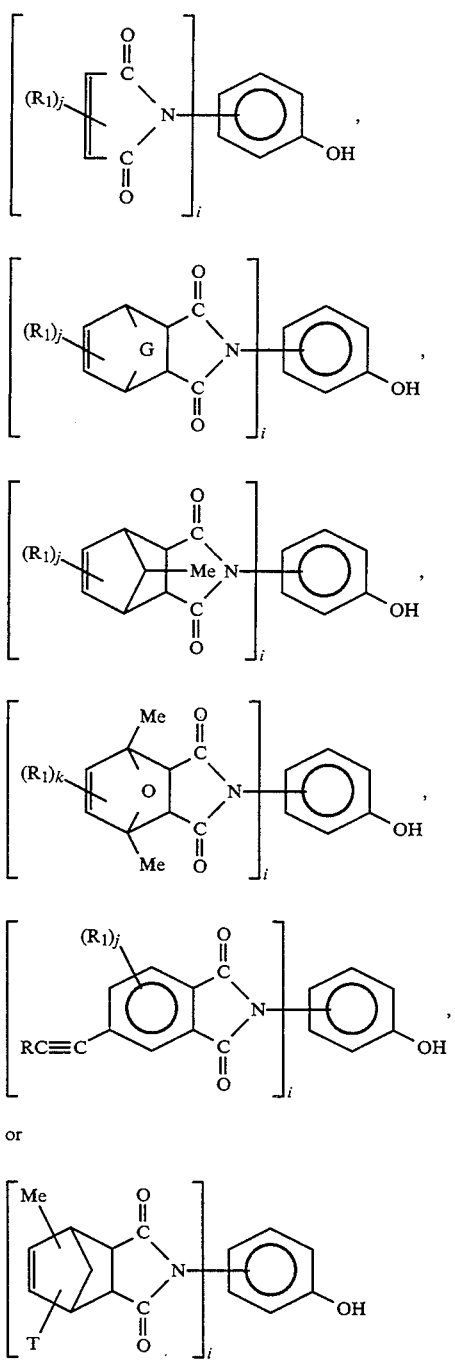

or

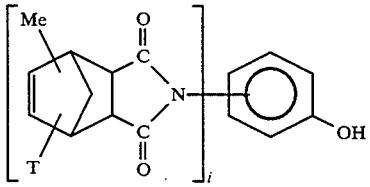

wherein
$R_1$ = lower alkyl, lower alkoxy, aryl, aryloxy, substituted alkyl, substituted aryl, or mixtures thereof;
j = 0, 1, or 2;
i = 1 or 2;
G = —CH$_2$—, —O—, —S—, —SO$_2$—, —CO—, —SO—, —CHR—, or —CR$_2$—;
k = 1 or 2;
Me = methyl;
T = allyl or methallyl; and R=hydrogen, methyl, or phenyl.

To obtain the highest thermal stability, the preferred end caps are:

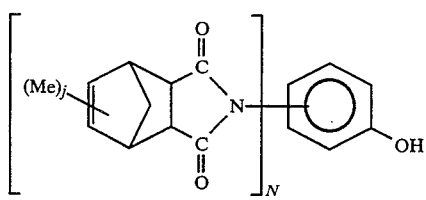

or

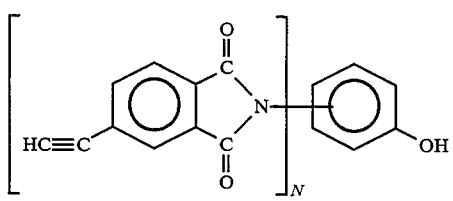

wherein
n=1 or 2 (preferably 2); and
j=0, 1, or 2.

The dihalogen preferably is an aromatic compound selected from the group consisting of:

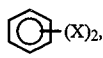

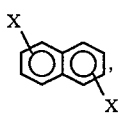

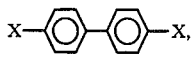

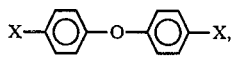

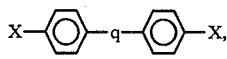

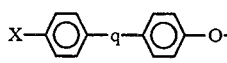

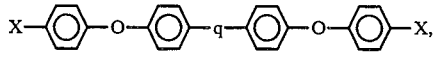

or

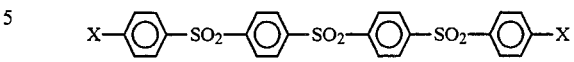

wherein
X=halogen, preferably chlorine; and
q=—S—, —SO$_2$—, —CO—, —(CH$_3$)$_2$C—, and —(CF$_3$)$_2$C—, and preferably either —SO$_2$— or —CO—.

The diols (i.e. dihydric phenols or bisphenols) are preferably selected from the group consisting of:

2,2-bis-(4-hydroxyphenyl)-propane (i.e., bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxyphenyl)-pentane;
2,2-bis-(4-hydroxynaphthyl)-propane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydrophenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane;

or mixtures thereof, as disclosed in U.S. Pat. No. 3,262,914. Diols having aromatic character (i.e., absence of aliphatic segments), such as bisphenol-A, are preferred.

The diol may also be selected from the group consisting of: hydroquinone; p,p'-biphenol; 4,4'-dihydroxydiphenylsulfide; 4,4'-dihydroxydiphenylether; 4,4'-dihydroxydiphenylisopropane; 4,4'-dihydroxydiphenylhexafluoropropane; or a polyaryl compound selected from the group consisting of:

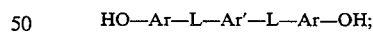

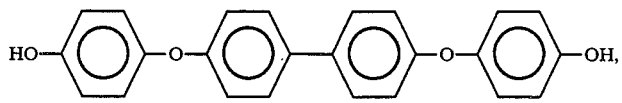

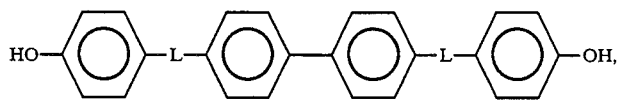

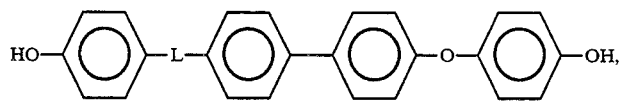

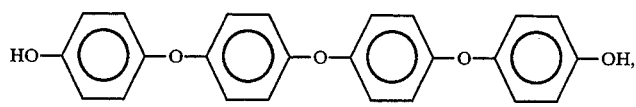
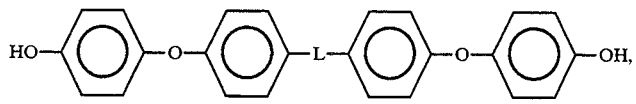
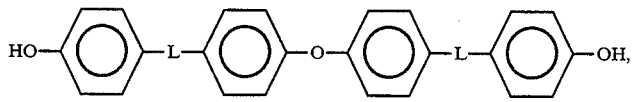
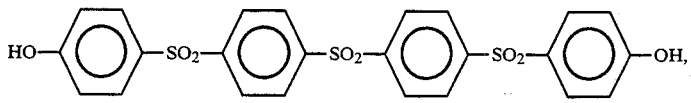
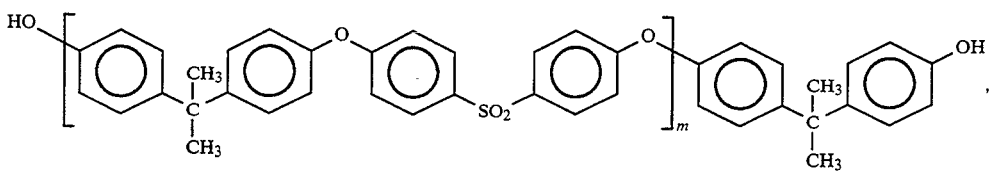
or
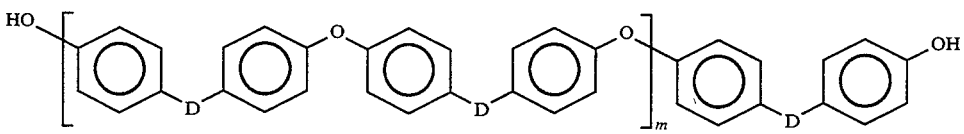
wherein
L=—CH$_2$—, —(CH$_3$)$_2$C—, —(CF$_3$)$_2$C—, —O—, —S—, —SO$_2$— or —CO—;
Ar′=
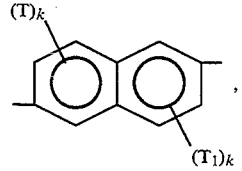;
Ar=
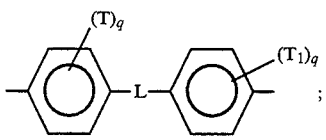,
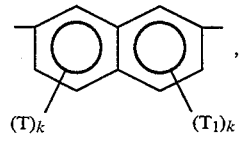,
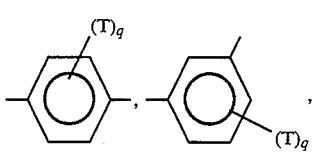,
-continued
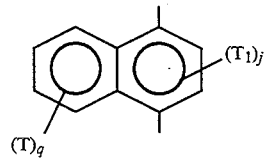,
or

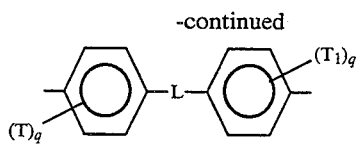

T and $T_1$—lower alkyl, lower alkoxy, aryl, aryloxy, substituted alkyl, substituted aryl, or mixtures thereof;
q=0–4;
k=0–3;
j=0, 1, or 2;
Me=methyl;
m=an integer, generally less than 5, and preferably 0 or 1; and
D=any of —CO—, —SO$_2$—, or —(CF$_3$)$_2$C—.

The diol may also be a Schiff base diol including a divalent radical selected from the group consisting of:

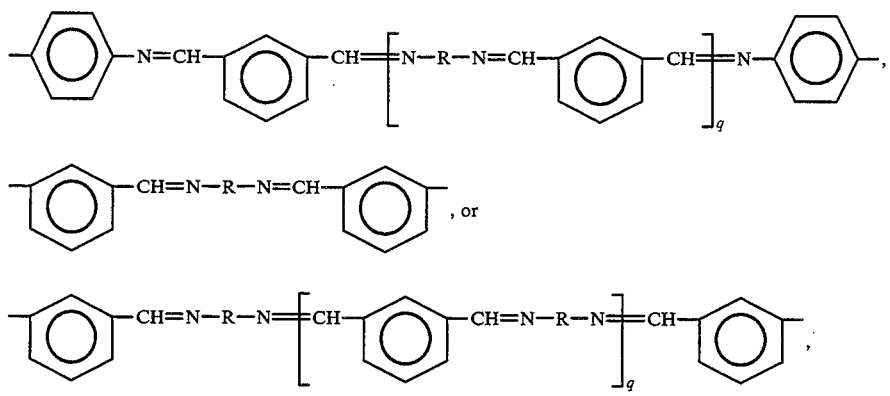

wherein R is selected from the group consisting of:
phenylene;
biphenylene;
naphthylene; or
a radical of the general formula:

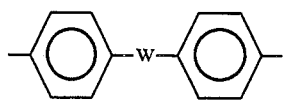

wherein W=—CH$_2$— or —SO$_2$—; or

While bisphenol-A is preferred (because of cost and availability), the other diols can be used to add rigidity to the oligomer without significantly increasing the average formula weight, and, therefore, can increase the solvent resistance. Random or block copolymers are possible.

Furthermore, the diols may also be selected from the those described in U.S. Pat. Nos. 4,584,364; 3,262,914, or 4,611,048.

Diols of this nature are commercially available. Some may be easily synthesized by reacting halide intermediate with bis-phenates, such as by the reaction of 4,4'-dichlorodiphenylsulfone with bis(disodium biphenolate), In any of the syntheses, the dialcohol can be replaced by a comparable disulfhydryl of the formula: HS—R$_2$—SH. Mixtures of dialcohols, or disulfhydryls, or dialcohols and disulfhydryls can be used.

Dopants for creating semiconductive or conductive composites from ethersulfones having Schiff base segments are preferably selected from compounds commonly used to dope other polymers, namely, (1) dispersions of alkali metals (for high activity) or (2) strong chemical oxidizers, particularly alkali perchlorates (for lower activity). Arsenic compounds and elemental halogens, while active dopants, are too dangerous for general usage, and are not recommended.

The dopants react with the polymers to form charge transfer complexes. N-type semiconductors result from doping with alkali metal dispersions. P-type semiconductors result from doping with elemental iodine or perchlorates.

While research into conductive or semiconductive polymers has been intense, the resulting compounds (mainly polyacetylenes, polyphenylenes, and polyvinylacetylenes) are unsatisfactory for aerospace applications because the polymers are:
(a) unstable in air;
(b) unstable at high temperatures;
(c) brittle after doping;
(d) toxic because of the dopants; or
(e) intractable.

These problems are overcome or significantly reduced with the conductive oligomers of the present invention.

The materials of the present invention generally exhibit greater oxidative stability and greater dimensional stability at elevated temperatures, greater impact strengths, greater dimensional stiffness over a wider range of temperatures, and greater toughness than prior art conductive oligomers and composites.

While conventional theory holds that semiconductive polymers should have (1) low ionization potentials, (2) long conjugation lengths, and (3) planar backbones, there is an inherent trade-off between conductivity and toughness or processibility, if these constraints are followed. To overcome the processing and toughness shortcomings common with Schiff base, oxazole, imidazole, or thiozole polymers, the oligomers of the present invention, include "sulfone" linkages interspersed along the backbone providing a mechanical swivel for the rigid, conductive segments of the arms. Phenoxyphenylsulfone or phenoxyphenylketone moieties are preferred. The resulting compounds are polyphenoxyphenylsulfoneimido oligomers with conductive segments.

The conductive or semiconductive oligomers and composites are prepared by including a suitable dopant within the cured composite. The dopant is added to the oligomer prior to curing.

While para-isomers have been shown, other isomers can be used. Mixed isomers can be used.

Oligomers of this general type have curing temperatures of about 350°–600° F. (usually 400°–500° F.), but reducing curing temperatures can be achieved when the oligomers are combined with coreactants in roughly equimolar amounts. The coreactants improve the solvent resistance of the composites, but reduce the thermoplastic properties. Suitable coreactants are selected from the group consisting of:

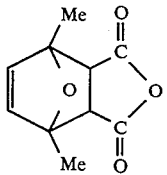

and

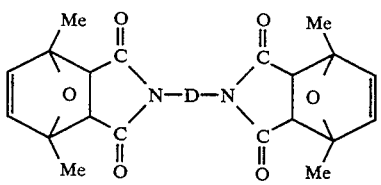

or similar compounds analogous to the imidophenol end cap of the oligomer, where D is an alkyl having 2 to 6 carbon atoms or an aromatic radical such as:

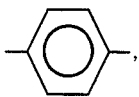

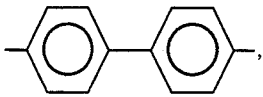

or

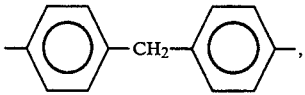

and Me=methyl.

Impact resistance of cured composites formed from prepregs of the oligomers can be increased without deleterious loss of solvent resistance by forming the prepregs with a blend of capped oligomers (to provide crosslinking upon curing) and uncapped polymers of a compatible backbone. Generally, a blend of oligomer and polymer is formed by dissolving the capped oligomer in a suitable first solvent, dissolving the uncapped polymer of the essentially the same backbone and average formula weight in a separate portion (aliquot) of the same solvent or in a solvent miscible with the first solvent, mixing the two solvent solutions to form a lacquer, and applying the lacquer to fabric in a conventional prepregging process.

Although the polymer in the cured blend usually has the same length backbone as the oligomer, the properties of the composite formed from the blend can be adjusted by altering the ratio of formula weights for the polymer and oligomer. The terminal groups of the polymer are unimportant so long as these groups do not react with or impede the crosslinking (i.e. addition polymerization) of the oligomer end caps. Also, it is probably not essential that the oligomer and polymer have identical repeating units, but that the oligomer and polymer merely be compatible in the solution prior to sweeping out as a prepreg. Of course, if the polymer and oligomer have identical backbones, compatibility in the blend is likely to occur. It may be preferable to make the blend with a relatively high average formula weight polymer so that the composite will have oligomeric and polymeric segments of comparable formula weight after the oligomer is cured.

The ethersulfone or sulfone polymers are made by the condensation of the diols and dihalogens, as described above, in a solution containing an excess of base ($K_2CO_3$, $Na_2CO_3$, $KHCO_3$, $NaHCO_3$, KOH, or NaOH). The formula weight of the polymer can be controlled by quenching the condensation with chlorobenzene, nitrobenzene, or phenol.

The ethersulfone or sulfone oligomers of the present invention can be blended with ethersulfone or sulfone polymers (i.e., polymers from the same chemical family) or with polymers from a different chemical family. Blends formed from oligomers and polymers from different chemical families we call "advanced composite blends" and describe in our copending U.S. patent application Ser. No. 07/167,604. In such advanced composite blends using ethersulfone or sulfone oligomers, the polymer may be selected from the group consisting of:

imidesulfone;
ether;
amide;
imide;
ester;
estersulfone;
etherimide;
amideimide;
esterimide;
oxazole;
thiazole;
imidazole;
oxazole sulfone;
thiazole sulfone;
imidazole sulfone; or the like.

Coreactants can also be used in the blends.

Because the average formula weight of the oligomer will increase appreciably upon curing, the blends generally will include a polymer having an average formula weight greater than the uncured oligomer. For example, the oligomer may have an average formula weight of about 1000–5000 while the corresponding polymer has an average formula weight of about 20,000–40,000. Upon curing, nevertheless, the oligomer and polymer will generally have average formula weights that are closer because of addition polymerization of the oligomer. Therefore, the problems sometimes encountered with blends having components of widely different average formula weight are not as pronounced in composites formed from the advanced composite blends of the present invention.

Advanced composite blends allow tailoring of the properties of high performance composites. They allow averaging of the properties of resins from different families to provide composites that do not have as severe shortcomings as the pure compounds. For example, the rigid nature of heterocycles (oxazole, thiazole, or imidazole) can be reduced by an advanced composite blend comprising a heterocycle oligomer and an ethersulfone polymer. The resulting composite will have a use temperature (thermo-oxidative stability) higher than pure ethersulfone and a flexibility greater than the pure heterocycle. Accordingly, the resulting composites have a blending or averaging of physical properties, which makes them candidates for particularly harsh conditions.

The blends may also include coreactive oligomeric segments as described in our copending U.S. patent application Ser. No. 07/174,747. In such coreactive oligomer blends, an oligomer of the formula:

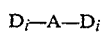

wherein
i=1 or 2;
A=an ethersulfone or sulfone backbone; and
D=an unsaturated hydrocarbon residue including a segment selected from the group consisting of:

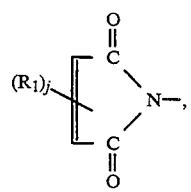

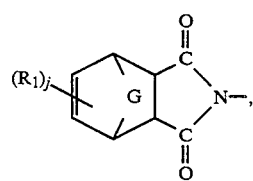

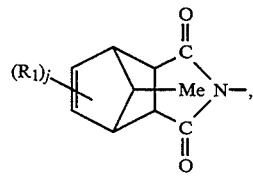

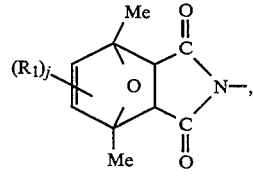

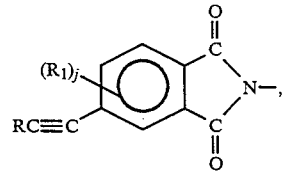

or

-continued

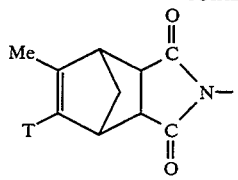

and, preferably,

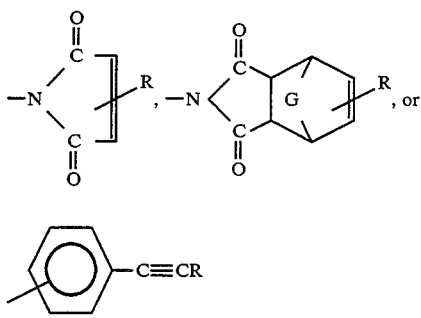

$R_1$'lower alkyl, aryl, substituted aryl (including hydroxyl or halo-substituents), lower alkoxy, aryloxy, halogen, or mixtures thereof (preferably lower alkyl);
j=0, 1, or 2;
Me=methyl;
T=allyl or methallyl;
G=—$SO_2$—, —S—, —O—, —CO—, —SO—, —$CH_2$—, —CHR—, or —$CR_2$—; and
R=hydrogen, lower alkyl, or phenyl
with a coreactive oligomer of the general formula:

wherein
k=1 or 2;
B=a hydrocarbon backbone that is from the same or a different chemical family as A;
Z=a hydrocarbon residue including a segment selected from the group consisting of:

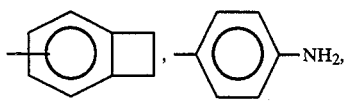

or

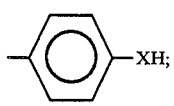

X=—O— or —S—.

The coreactive oligomer blends may comprise an equimolar mix of the coreactive oligomers or any other ratio to obtain the desired physical properties achieved through curing that involves mutual (interlinking) polymerization and addition or homopolymerization. The individual resins should initially have relatively low average formula weighs to remain relatively easy to process until the curing reaction when the extended chain and block copolymers are formed to produce the composite.

The coreactive oligomer blends of the present invention can also include noncrosslinking polymers, as desired, to provide the desired properties in the composites. That is, one or more of the oligomers in the coreactive blend may itself be a blend of a crosslinking oligomer and a noncrosslinking compatible polymer, thereby forming a blend with three or more resin components.

Upon curing, the oligomers in coreactive oligomer blends homopolymerize (i.e. addition polymerize) by crosslinking and form block copolymers through the Michaels addition reaction between the hydrocarbon unsaturation of one oligomer and the amine, hydoxyl, or sulfhydryl group of the other. The reaction of the hydrocarbon unsaturation of one oligomer with the

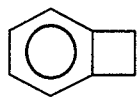

functionality of the other follows the mechanism described in U.S. Pat. No. 4,719,283 to form a cyclohexane linkage.

The Michaels addition reaction is illustrated as follows:

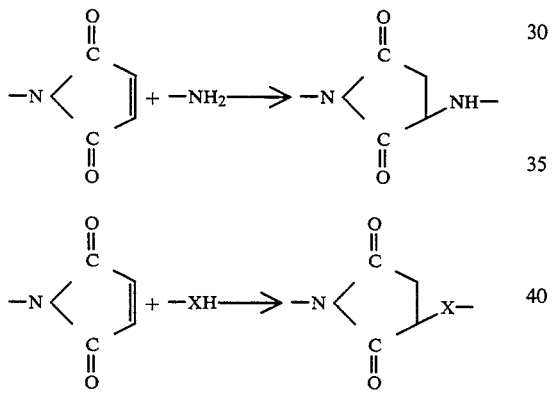

wherein X=—O— or —S—.

We believe that the nadic caps decompose upon heating to form the maleic caps and to release a cyclopentadiene (or related compounds), so that the cured composites have the linkages illustrated above when amines, phenols, or sulfhydryls are used.

Ethersulfone or sulfone oligomers can also be prepared by condensing about 2 moles of a nitro- or halo-end cap monomer of the formula $E_i$—$\phi$—$NO_2$ or $E_i$-—$\phi$—X with n+1 moles of a diol and n moles of a dihalogen, wherein n≧1.

The end cap monomers are prepared by condensing suitable unsaturated anhydrides with diaminophenol in the manner described in U.S. Pat. No. 4,604,437 with respect to allyl or methallyl-substituted methylbicyclo[2.2.1]hept-5-ene-2,3-dicarboximides. We have found that high performance oligomers useful in aerospace applications can also be prepared using a pyrimidine radical in place of the phenyl radical in the end-cap monomers that we have customarily used. In this regard, the anhydrides can be condensed with a pyrimidine of the general formula:

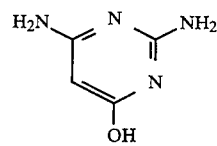

(as described in U.S. Pat. No. 3,461,461) to form difunctional pyrimidine-based end-cap monomers that include an active —OH functionality.

Corresponding pyrimidine-based end-cap monomers having an active halogen functionality can be prepared from the corresponding halogen-substituted pyrimidine.

For these end-cap monomers, an anhydride of the general formula:

$$\begin{array}{c} CO \\ D \diagup \diagdown O \\ \diagdown \diagup \\ CO \end{array}$$

wherein D=

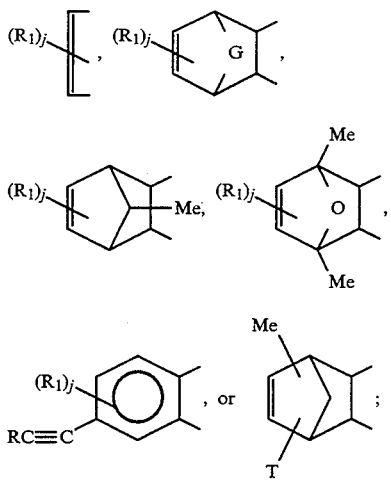

wherein
$R_1$—lower alkyl, lower alkoxy, aryl, substituted aryl substituted alkyl (including hydroxyl or halo-substituents), aryloxy, halogen, or mixtures thereof;
j=0, 1, or 2;
Me=methyl;
G=—$SO_2$—, —$CH_2$, —S—, —O—, —CO—, —SO—, —CHR—, or —$CH_2$— (preferably —$CH_2$— or —O—);
T=methallyl or allyl; and
R=hydrogen, lower alkyl, or phenyl
is condensed with a pyrimidine of the formula:

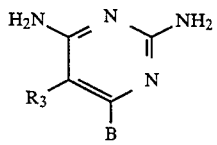

wherein
B=—OH or halogen (preferably, chlorine); and
$R_3$=hydrogen, lower alkyl, or aryl (and, preferably, hydrogen)

or with diaminophenol).

Multidimensional ethersulfone or sulfone oligomers can also be prepared by condensing an aromatic hub, such as phloroglucinol, with the diols, dihalogens, and end cap monomers. In the generalized case, the multidimensional oligomers have the formula:

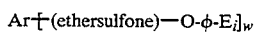

wherein
Ar=an aromatic hub of valency w;
i=1 or 2;
$\phi$=phenyl;
w=an integer greater than or equal to 3, and, preferably, 3 or 4; and
E=a end cap monomer as previously described.
In some cases the phenyl may be replaced with a pyrimidinyl radical.

A multidimensional oligomer, accordingly, has a central hub and three or more radiating chains or arms. Each chain includes a crosslinking functionality at its distal end. Each chain generally has identical structure to that of the others.

The simplest ethersulfone multidimensional oligomer can be prepared by condensing phloroglucinol with Cl—$\phi$—SO$_2$—$\phi$—Cl and an imidophenol end cap monomer, wherein 0=phenyl and the ratio of hub: dihalogen: end cap monomer is about 1:3:3. The chain can be extended by including additional dihalogen and a diol. Here, however, the ratio of reacts would be about 1 mole hub: 3n moles diol: 3n+3 moles dihalogen: 3 moles end cap monomer, wherein n≧1. To avoid competitive side reactions, the synthesis could be staged to react the dihalogen with the hub, the dihalogen with the end cap monomer, and the mixing the pre-reacted halogens with the diol to produced multidimensional oligomers having arms of substantially the following formula:

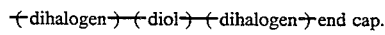

Of course, the multidimensional oligomers can be blended to form ordinary, advanced composite, or co-reactive oligomer blends. Prepregs and composites of the multidimensional oligomers and blends are easily prepared.

The hub may be a halo-substituted or nitro-substituted compound, with the ratio of diol and dihalogen adjusted accordingly. Halo- or nitro- end cap monomers can replace the imidophenols described in the example.

The blends may yield semi-interpenetrating networks of the general type described by Egli et al., "Semi-Interpenetrating Networks of LARC-TPI" available from NASA-Langley Research Center.

The oligomers and blends of the present invention can be combined with reinforcing materials and cured to composite materials using heat or chemicals to activate crosslinking or interlinking between end caps. Prepregs can be prepared by conventional prepregging techniques. While woven fabrics are the typical reinforcement, the fibers can e continuous or discontinuous (in chopped or whisker form) any may be ceramic, organic, carbon (graphite), or glass, as suited for the desired application. Curing generally is conducted in conventional vacuum bagging techniques at elevated temperatures. The curing temperature varies with the choice of end cap. If desired, mixtures of end caps might be used.

Dopant should be added to the oligomer prior to prepreging, if conductive or semiconductive composites are being prepared.

While preferred embodiments have been described, those skilled in the art will readily recognize alterations, variations, and modifications which might be made without departing from the inventive concept. Therefore, the claims should be interpreted liberally with the support of the full range of equivalents known to those of ordinary skill based upon this description. The examples are given to illustrate the invention and not to limit it. The claims should be limited only as is necessary in view of the pertinent prior art.

We claim:

1. An ethersulfone prepreg comprising an ethersulfone, crosslinkable oligomer and a reinforcing additive in fiber of particulate form, the oligomer being the condensation product of the simultaneous reaction of about 2 moles of an end cap monomer having the formula

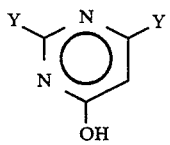

n=1 moles of a dihalogen; and
n moles of a diol, wherein Y is selected from the group consisting of:

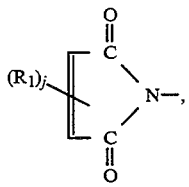

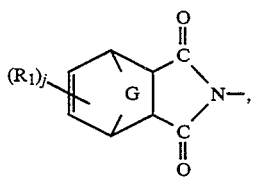

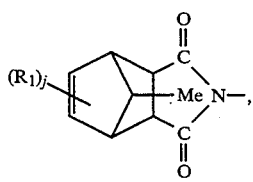

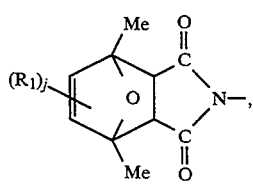

-continued

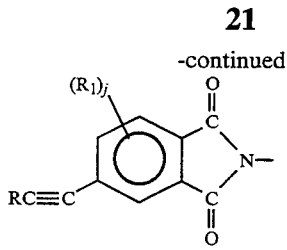

and

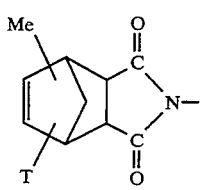

n≧1;
j=0, 1, or 2;
G=—CH₂—, —O—, —S—, —SO₂—, —SO—, —CO—, —CHR—, or —CH₂—;
T=alkyl or methallyl;
Me=methyl;
R=hydrogen, methyl, or phenyl;
the dihalogen is selected from the group consisting of:

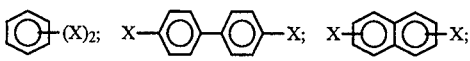

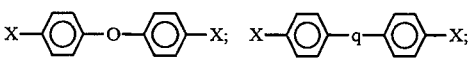

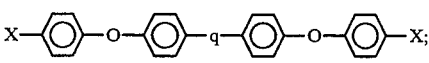

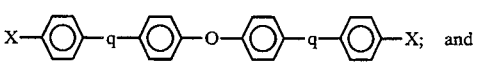

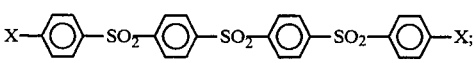

X=halogen; and
q=—S—, —SO₂—, —CO—, —(CH₃)₂C—, or —(CF₃)₂C—.

2. The prepreg of claim 1 wherein Y is selected from the group consisting of:

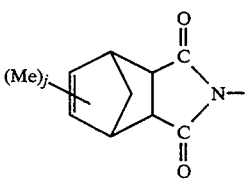

and

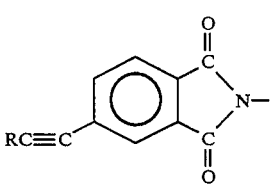

3. The prepreg of claim 1 further comprising a co-reactant mixed with the oligomer.

4. The prepreg of claim 1 further comprising a compatible noncrosslinking polymer mixed with the oligomer.

5. The prepreg of claim 3 further comprising a compatible, noncrosslinking polymer mixed with the oligomer and coreactant.

6. A method for preparing a prepreg having a blend of a crosslinkable ethersulfone oligomer and of a polymer compatible with the oligomer, comprising the steps of:

(a) preparing the ethersulfone oligomer by reacting about 2 moles of an end cap imidopyrimidine having a reactive —OH, n moles of a diol, and n+1 moles of a dihalogen moiety in the presence of excess base under an inert atmosphere wherein at least one of the diol and dihalogen moiety includes an intermediate sulfone linkage;

(b) dissolving the oligomer in a first solvent;

(c) dissolving a compatible polymer in the first solvent or in another solvent miscible in the first solvent;

(d) mixing the dissolved oligomer and the dissolved polymer to form a blended lacquer; and (e) mixing the lacquer with a reinforcement to form the prepreg.

7. The prepreg of claim 6 wherein the imidopyrimidine has the formula

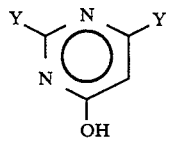

and Y is selected from the group consisting of:

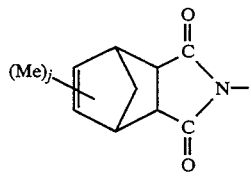

and

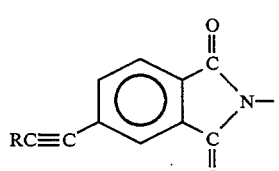

8. The method of claim 6 wherein substantially equimolar amounts of the oligomer and polymer are mixed.

9. The prepreg formed by the method of claim 6.

10. The method of claim 6 further comprising the step of dissolving a coreactant with the oligomer and polymer in the blended lacquer.

11. The prepreg formed by the method of claim 10.

12. The ethersulfone prepreg of claim 1 wherein the dihalogen is selected from the group consisting of:

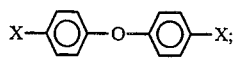

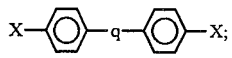

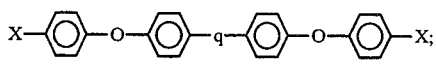

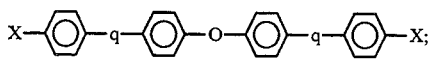

and

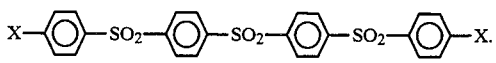

13. A composite comprising the cured prepreg of claim 1.

14. A composite comprising the cured prepreg of claim 3.

15. A composite comprising the cured prepreg of claim 4.

16. A prepreg comprising an ethersulfone oligomer and a reinforcing additive in fiber or particulate form, the oligomer containing a plurality of unsaturated hydrocarbon end cap functionalities connected to a pyrimidenyl radical on each end of an ethersulfone backbone through an imide linkage and being formed by the simultaneous condensation of an end cap monomer, a diol, and a dihalogen wherein at least one of the diol and dihalogen include an intermediate sulfone linkage.

17. The prepreg of claim 16 wherein each oligomer contains at least four unsaturated hydrocarbon end cap functionalities.

18. A prepreg comprising an ethersulfone, multidimensional oligomer and a reinforcing additive in fiber or particulate form, the oligomer being the condensation product of the simultaneous condensation of a polyfunctional hub selected from the group consisting of aromatic polyols and aromatic polyhalogens having at least three reactive —OH or halo-substituents, a reactant selected from the group consisting of diols and dihalogen having an intermediate sulfone linkage and a crosslinking end cap monomer selected from the group consisting of imidopyrimidine having a reactive —OH, and imidopyrimidines having a reactive halo-substituent.

19. A composite comprising the cured prepreg of claim 18.

* * * * *

UNITED STATES PATENT AND TRADEMARK OFFICE
CERTIFICATE OF CORRECTION

PATENT NO. : 5,446,120
DATED : August 29, 1995
INVENTOR(S) : Hyman R. Lubowitz and Clyde H. Sheppard It is certified that error appears in the above-identified patent and that said Letters Patent is hereby corrected as shown below:

In column 4, line 64, "N = 1 moles" should read -- n + 1 moles --.

In column 5, line 47, "n + 1moles" should read -- n + 1 moles --.

In column 16, line 25, "$R_1$'lower" should read -- $R_1$ = lower --.

In column 20, claim 1, line 34, "n = 1 moles" should read -- n + 1 moles --.

In column 21, claim 1, line 18 before "n $\geq$ 1;" it should read
        -- $R_1$ = lower alkyl, lower alkoxy, aryl, aryloxy, substituted alkyl, substituted aryl, or mixtures thereof; --.

In column 21, claim 1, line 23, "T = alkyl" should read -- T = allyl --.

In column 24, claim 18, line 20, "dihalogen having" should read -- dihalogens having --.

In column 24, claim 18, line 20, "linkage and" should read -- linkage, and --.

UNITED STATES PATENT AND TRADEMARK OFFICE
CERTIFICATE OF CORRECTION

PATENT NO. : 5,446,120

DATED : August 29, 1995

INVENTOR(S) : Hyman R. Lubowitz and Clyde H. Sheppard

It is certified that error appears in the above-identified patent and that said Letters Patent is hereby corrected as shown below:

In column 24, claim 18, line 22, "imidopyrimidine" should read -- imidopyrimidines --.

Signed and Sealed this

Seventeenth Day of December, 1996

Attest:

BRUCE LEHMAN

Attesting Officer

Commissioner of Patents and Trademarks